(12) United States Patent
Spielman et al.

(10) Patent No.: US 8,313,657 B1
(45) Date of Patent: Nov. 20, 2012

(54) METHOD AND SYSTEM FOR REMOVAL OF AMMONIA FROM WASTEWATER BY ELECTROLYSIS

(76) Inventors: Rick B. Spielman, Tijeras, NM (US); Link E. Summers, Taos, NM (US)

( * ) Notice: Subject to any disclaimer, the term of this patent is extended or adjusted under 35 U.S.C. 154(b) by 0 days.

(21) Appl. No.: 12/802,776

(22) Filed: Jun. 14, 2010

Related U.S. Application Data

(62) Division of application No. 11/732,655, filed on Apr. 4, 2007, now Pat. No. 7,736,776.

(60) Provisional application No. 60/788,714, filed on Apr. 4, 2006.

(51) Int. Cl.
*B01D 59/00* (2006.01)
*C02F 3/00* (2006.01)

(52) U.S. Cl. .......... 210/748.17; 210/748.01; 204/520; 204/522; 204/525; 204/526; 204/530; 204/533; 422/186; 422/22; 429/4

(58) Field of Classification Search .......... 210/748.01, 210/748.17; 205/617, 688, 742, 743, 745, 205/761; 204/155, 157.42, 164, 176, 177, 204/194, 520, 522, 525, 526, 627, 630, 633; 422/22, 186; 429/21; 315/246, 194, 231, 315/261; 372/30, 29.1, 38.01
See application file for complete search history.

(56) References Cited

U.S. PATENT DOCUMENTS

| | | | | | |
|---|---|---|---|---|---|
| 3,291,713 | A | * | 12/1966 | Parsi | 204/524 |
| 3,802,878 | A | * | 4/1974 | Lindstrom | 419/2 |
| 4,214,050 | A | * | 7/1980 | Blay | 435/29 |
| 4,699,772 | A | * | 10/1987 | de Lathouder | 423/359 |
| 5,130,020 | A | * | 7/1992 | Meckstroth | 210/264 |
| 6,071,473 | A | * | 6/2000 | Darwin | 422/20 |
| 6,083,377 | A | * | 7/2000 | Lin et al. | 205/617 |
| 2002/0117457 | A1 | * | 8/2002 | Benton et al. | 210/749 |
| 2004/0134862 | A1 | * | 7/2004 | Greenberg | 210/748 |
| 2004/0174657 | A1 | * | 9/2004 | Andelman et al. | 361/503 |

* cited by examiner

*Primary Examiner* — Joseph Drodge
*Assistant Examiner* — Cameron J Allen
(74) *Attorney, Agent, or Firm* — James Creighton Wray

(57) ABSTRACT

A method and system are described to treat ammonia-containing wastewater or process waters. Sewage containing human or animal waste and certain process liquids, typically water, contains high levels of nitrogen in the form of ammonia. An electro-chemical method to extract the ammonia from the wastewater is also described. The system described is one implementation of this method. One or more electrolysis cells convert ammonium to ammonia where the generated ammonia gas can readily be extracted for disposal or reuse. Such a system can involve electrolysis cells of numerous types as described herein.

16 Claims, 3 Drawing Sheets

METHOD AND SYSTEM FOR REMOVAL OF AMMONIA FROM WASTEWATER BY ELECTROLYSIS

This application is a division of application Ser. No. 11/732,655 filed Apr. 4, 2007, now U.S. Pat. No. 7,736,776 issued Jun. 15, 2010 which is hereby incorporated by reference in its entirety as if fully set forth herein.

This application claims the benefit of U.S. Provisional Application No. 60/788,714 filed Apr. 4, 2006, which is hereby incorporated by reference in its entirety.

TECHNICAL FIELD OF THE INVENTION

The present invention relates generally to the field of treatment of wastewater and process water, more specifically, to the reduction in the level of ammonia and organic ammonia compounds in wastewater and process water, regardless of source.

BACKGROUND OF THE INVENTION

Human and animal waste is the primary source of nitrogen in most wastewater discharges. In addition, certain process waters, including but not limited to industrial process waters, contain significant amounts of nitrogen compounds. Wastewater containing nitrogen compounds such as ammonia, organic nitrogen, nitrates, and nitrites that contaminate ground and surface water resources are a major concern in a world facing potable water shortages. Traditional wastewater systems do little or nothing to reduce the level of nitrogen in the released wastewater. No low-cost technology is available to directly remove ammonia from wastewater. Release of these nitrogen compounds to environmental surface water, or especially ground water, is to be avoided. In addition, the removal of nitrogen compounds from certain processes using this method may be advantageous.

Existing systems of wastewater treatment are limited to treating wastewater with bacterial digestion, oxidation, settling, and disinfection (usually using chlorination). More advanced methods, such as ozone and ultraviolet radiation, also are used to treat water and wastewater. There are no existing systems in which wastewater containing ammonia is treated to directly remove ammonia from the water. Existing systems discuss sterilization, oxidation, and biological systems but not electro-chemical technologies.

It is known to use of ozone alone to sterilize water and/or treat the organic content water. For example, U.S. Pat. No. 4,007,120 issued to Bowen, and entitled "Oxidation and ozonation chamber", describes the use of ozone to treat and disinfect water. U.S. Pat. No. 4,053,399 issued to Donnelly, et al. and entitled "Method and system for waste treatment", describes the use of ozone to oxidize and disinfect wastewater. U.S. Pat. No. 4,176,061 issued to Stopka, and entitled "Apparatus and method for treatment of fluid with ozone", describes the use of ozone in the form of micro-bubbles to oxidize and to disinfect wastewater. U.S. Pat. No. 4,255,257 issued to Greiner, et al. and entitled "Process for the treatment of water", describes the use of pressurized ozone to treat water. U.S. Pat. No. 4,545,716 issued to Boeve, and entitled "Method of producing ultrapure, pyrogen-free water", describes the use of highly-concentrated, substantially-pure ozone to treat deionized water. U.S. Pat. No. 4,572,821 issued to Brodard, et al. and entitled "Apparatus for dissolving ozone in a fluid", describes the use of pressurized ozone to treat water. U.S. Pat. No. 5,130,032 issued to Sartori, and entitled "Method for treating a liquid medium", describes the use of ultrasound to disperse ozone in water and the use of ultrasound to aid in the cleanup of ozonated water. U.S. Pat. No. 5,207,993 issued to Burris, and entitled "Batch liquid purifier", describes the use of ozone in water with recirculation of the water through the ozone injection region to purify water. U.S. Pat. No. 5,868,945 issued to Morrow, et al. and entitled "Process of treating produced water with ozone", describes the use of ozone to treat water, containing hydrocarbons, at elevated temperatures. U.S. Pat. No. 6,006,387 issued to Cooper, et al. and entitled "Cold water ozone disinfection", describes the use of ozone dissolved in water to disinfect mechanical assemblies. U.S. Pat. No. 6,115,862 issued to Cooper, et al. and entitled "Cold water ozone disinfection", describes the use of ozone dissolved in water to disinfect mechanical assemblies. The disclosures of each of these references are herein incorporated by reference to the extent that they are not inconsistent with this application.

There also are disclosures relating to the use of oxidation, singly, to treat wastewater or water. For example, U.S. Pat. No. 3,992,295 issued to Box Jr., et al. and entitled "Polluted water purification", describes a process of catalyzed oxidation. U.S. Pat. No. 4,141,829 issued to Thiel, et al. and entitled "Process for wet oxidation of organic substances", describes a process of oxidation occurring at elevated temperatures. U.S. Pat. No. 4,604,215 issued to McCorquodale, and entitled "Wet oxidation", describes a process of oxidation occurring at elevated temperatures. U.S. Pat. No. 4,699,720 issued to Harada, et al. and entitled "Process for treating wastewater by wet oxidations", describes a process of oxidation using catalysts. U.S. Pat. No. 4,793,919 issued to McCorquodale, and entitled "Wet oxidation system", describes a process of oxidation occurring with mixing or stirring of the fluid. U.S. Pat. No. 5,053,142 issued to Sorensen, et al. and entitled "Method for treating polluted material", describes a process of oxidation occurring in a fluid. U.S. Pat. No. 5,057,220 issued to Harada, et al. and entitled "Process for treating waste water", describes a process of oxidation using catalysts. U.S. Pat. No. 5,145,587 issued to Ishii, et al. and entitled "Method for treatment of waste water", describes a process of oxidation at elevated temperatures. U.S. Pat. No. 5,158,689 issued to Ishii, et al. and entitled "Method for purification of waste water", describes a process of oxidation at elevated temperatures.

Additionally, U.S. Pat. No. 5,370,801 issued to Sorensen, et al. and entitled "Method for treating polluted material", describes a process of oxidation occurring in a fluid. U.S. Pat. No. 5,614,087 issued to Le, and entitled "Wet oxidation system", describes a process of oxidation occurring in a stirred or mixed fluid. U.S. Pat. No. 5,807,484 issued to Couture, et al. and entitled "Waste water treatment", describes a process of oxidation using trickle filters. U.S. Pat. No. 5,888,389 issued to Griffith, et al. and entitled "Apparatus for oxidizing undigested wastewater sludges", describes a process of supercritical oxidation occurring in a fluid at elevated temperatures and pressures.

No systems exist in the field of electrolytic removal of ammonia by direct electrolysis or by high pH chemical conversion at an electrolytic electrode. Needs exist for new systems of electrolytic removal of ammonia by direct electrolysis or by high pH chemical conversion at an electrolytic electrode.

SUMMARY OF THE INVENTION

A method is disclosed that directly removes ammonia (ammonium) from clarified wastewater. Further a system is disclosed that applies this method to treat and to remove specified levels of ammonia from wastewater and other process waters.

Human and animal waste can be treated by physical, chemical, or biological means such as: aerobic digestion, anaerobic digestion, advanced oxidation, chemical action, filtration, and solids separation. While major reductions in solids can be expected using these conventional processes, there is little reduction in nitrogen containing compounds, particularly ammonia.

A primary result of this invention is to directly remove ammonia in its aqueous form from wastewater or other process waters. Ammonia in water is typically in the form of ammonium ion —$NH_4$. This is a form that is readily used by plants and is one major cause of algae and plant growth in the environment where wastewater is discharged.

This invention provides a simple and direct method to remove aqueous ammonia by electro-chemistry and electrolysis. Metallic electrodes are placed into the wastewater stream. A direct current voltage is applied to the plate electrodes; and current flows from the anode to the cathode. Electrolysis of the water occurs, generating oxygen at the anode and hydrogen at the cathode. This electrolysis has another important effect. The pH at the cathode is increased. We find that the pH at or near the cathode can exceed 9. At this pH aqueous ammonia is converted to ammonia gas. The addition of air at or below the cathode sparges the ammonia from the water and removes it from the system. The ionic polarity of the ammonium has an important secondary effect. Ammonium is directly attracted to the anode, and, in some conditions, electrolysis of the ammonium into ammonia occurs. Again, the addition of air at the anode sparges the ammonia, removing it from the system.

Approximately up to 98%, or more, of ammonia is removed from the overall wastewater stream using a system based on this inventive method.

The configuration described has a number of advantages. The ammonia is removed from the system with the application of electrical energy. There are no waste products. The ammonia that is removed from the wastewater can be recovered using standard refrigeration techniques and can result in a valuable byproduct—fertilizer. Unlike biological solutions, our invention does not rely on living organisms for the success of the process. The process described herein is unlikely to be upset or interrupted by the presence of materials that are toxic to the organisms necessary for biological systems to operate.

It is therefore an object of the invention to describe a method and to provide a system and an apparatus for the treatment and/or removal of ammonia-containing compounds from wastewater or process waters that greatly reduces the level of ammonia reaching the environment.

These and further and other objects and features of the invention are apparent in the disclosure, which includes the above and ongoing written specification, with the drawings.

DETAILED DESCRIPTION OF THE PREFERRED EMBODIMENTS

Figure 1:
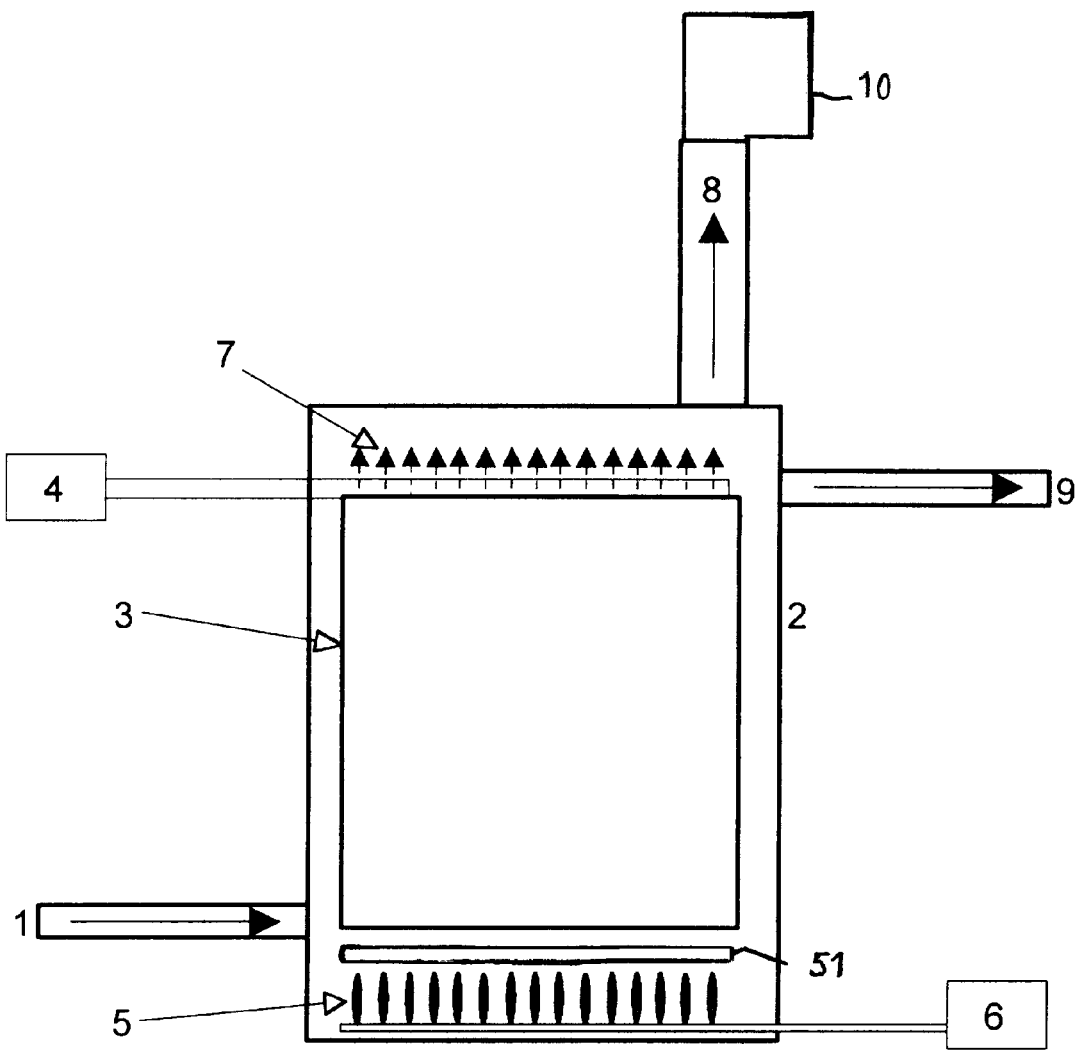
FIG. 1 is a diagram of the method of the invention.

Two embodiments of a method of ammonia removal are disclosed herein. The embodiments differ in their potential electrical efficiency, but otherwise operate similarly. Those skilled in the art may recognize that other embodiments are possible but we decline to list all possible combinations herein.

The ammonia removal from the waste or process stream can reach approximately 90% to 98%, or higher, using the inventive system described below.

One embodiment of the system consists of one or more pairs of electrode plates arranged in a substantially planar fashion. The effectiveness of this or other embodiments is not impacted by the use of other geometries such as cylindrical geometries. The electrodes must be fabricated from corrosion resistant materials such as, but not limited to, titanium, platinum, or gold. Coatings may be placed on the titanium. These coatings may retard corrosion of the substrate and may aid in the efficiency of the electrolysis process. These coatings may consist of, but are not limited to, thin layers of such oxides as rhenium oxide, zirconium oxide, and rhodium oxide.

The embodiment uses, but is not limited to, electrodes whose width is 30 centimeters (cm) and whose length is 100 cm. This results in an electrode area of ~3000 square centimeters ($cm^2$). Electrode dimensions can range from a few cm to hundreds of cm and are limited only by the physical constraints of the application and the engineering required to hold the electrode spacing to adequate tolerances. The electrodes are held in position using insulating spacers located at arbitrary points, but ideally near the edges of the plates where the flow of wastewater is not impeded. The sole purpose of the insulating spacers is to provide for the positive location of the electrodes, thus preventing the accidental shorting of the electrodes.

A voltage, typically, but not limited to, 4.5 V, is placed between the electrodes. The applied voltage can span the range of between 3.0 V and 50 V depending in the spacing of the electrodes and the conductivity (salinity) of the water. It is advantageous to keep the current density on the electrodes below 0.15 amperes (A) per $cm^2$ in order to maximize the electrode lifetime. In any case the successful operation of this, embodiment is not significantly impacted by the absolute magnitude of the current on the electrodes.

In operation, electrical current flows uniformly through the water between the plates. This current heats the water and is a parasitic loss and has no beneficial action. It is therefore advantageous to operate with the electrode spacing as small as is mechanically possible. The spacing is typically limited by the flatness of the electrodes, particle content of the wastewater, and the operational safety margin desired for the system. The first embodiment uses, but is not limited to, a spacing of 3 millimeters (3 mm). Smaller electrode spacings permit lower operational voltages for the system. Voltage regulation provides no added performance to the system. During electrolytic cell operation, the pH of the water near the cathode increases to level >9. At or above a pH of 9, aqueous ammonium ($NH_4$) is converted to gaseous ammonia ($NH_3$).

Wastewater flows through the space between the plates. In this embodiment the water flows from the bottom of the electrodes to the top. Other water flow patterns are possible but upward flow assists in the removal of gaseous ammonia from the volume between the plates.

Fine bubbles of air are injected into the volume of water at the bottom of the electrode plates. The air flows upwards along and between the electrodes. This air carries with it gases generated at the electrodes including the ammonia released by the electro-chemical and electrolytic process. This gas can be released directly to the air if regulations permit or the ammonia in the gas stream can be captured using standard condensation techniques.

Under normal operation this embodiment at a voltage of 4.5 V will conduct a total current of ~100 A per electrode pair. An embodiment consisting of multiple electrode pairs will draw a total current in multiples of the base 100 A per electrode pair. Someone skilled in the art will recognize that multiple electrodes can be electrically connected either in series or in parallel depending on the necessities of a particular installation. At an operational voltage of 4.5 V the embodiment as described will consume a peak electrical power of 450 watts (W) per electrode pair.

A second embodiment of the system consists of one or more pairs of porous electrodes arranged in a substantially planar fashion. The effectiveness of this or other embodiments is not impacted by the use of other geometries such as cylindrical geometries. The porosity of the electrodes is needed in order to maintain a flow of wastewater through the cell. The electrodes are fabricated from corrosion resistant materials such as but not limited to titanium. Other coatings may be placed on the titanium. These coatings may consist of, but are not limited to, thin layers of such oxides as rhenium oxide, zirconium oxide, and rhodium oxide.

The embodiment uses, but is not limited to, electrodes whose width is 30 cm and whose length is 100 cm. This results in an electrode area of ~3000 $cm^2$. Electrode dimensions can range from a few cm to hundreds of cm and are limited only by the physical constraints of the application and the engineering required to hold the electrode spacing to adequate tolerances.

The electrodes are positioned closely together using an insulating membrane with a thickness of 1 mm. The membrane materials are such as but not limited to Nafion 450 to separate the anode from the cathode. The anode is typically on the effluent side and is used to protect the membrane from fouling with organics. The sole purpose of the thin membrane is to provide for the smallest possible spacing of the electrodes, thus minimizing the operational voltage and, hence, power. A voltage, typically, but not limited to, 1.5 V, is placed between the electrodes. The applied voltage can span the range of between 1.0 V and 50 V depending in the thickness of the membrane and the conductivity (salinity) of the water.

In operation current flows through the water saturated membrane between the plates. This current heats the water and is a parasitic loss and has no beneficial action. It is therefore advantageous to operate with thinnest membrane possible. The spacing is typically limited by the uniformity of the membrane and the operational safety margin desired for the system. The second embodiment uses, but is not limited to, a membrane thickness of 1 mm. During electrolytic cell operation, the pH of the water near the cathode increases to level>pH 9. At or above a pH of 9, aqueous ammonium ($NH_4$) is converted to gaseous ammonia ($NH_3$).

Wastewater flows through the electrodes and the membrane. In this embodiment the water flows from the bottom of the electrodes to the top. But the flow is arranged to move through the anode, the membrane, and out the cathode. Other water flow patterns are possible but flow through the anode refreshes the water in the membrane and the upward flow assists in the removal of gaseous ammonia from the volume between the plates.

Fine bubbles of air are injected into the volume of water at the bottom of the cathode. The air flows upwards along and between the cathodes. This air carries with it gases generated at the electrodes including the ammonia released by the electro-chemical and electrolytic process. This gas can be released directly to the air if regulations permit or the ammonia in the gas stream can be captured using standard condensation techniques.

Under normal operation at a voltage of 1.5 V the second embodiment will conduct a total current of ~100 A per electrode pair. An embodiment consisting of multiple electrode pairs will draw a total current in multiples of 100-A per electrode pair. Someone skilled in the art will quickly recognize that the electrodes can be electrically connected either in series or in parallel depending on the necessities of a particular installation. At an operational voltage of 1.5 V the embodiment as described will consume a peak electrical power of 150 W per electrode pair. Note the power consumption of the second embodiment is 33% of that used by the first embodiment.

All embodiments of this invention suffer from the accumulation of mineral deposits on the cathode. The most common of these deposits is calcium carbonate. Calcium and other metal anions move to the cathode where the high pH of the water takes the carbonates from solution. If left unchecked this would eventually completely cover the electrode and prevent the successful operation of the system. Three methods for preventing the build up of carbonates are possible. First, reversing the polarity of the plates on a regular basis removes the built up deposits. If the cathode becomes the anode the acidic environment will dissolve the carbonate buildup. Second, the application of a moderate level of ultrasonic acoustic energy prevents the build up of mineral deposits. Third, frequent abrasion of the surface with a mechanical scrubber prevents the excessive buildup of minerals. In the case of the membrane used in embodiment two, an occasional detergent wash may be necessary to remove greases and oils that may accumulate in the membrane. The oxygen generated from the anode side assists membrane cleanliness.

The preferred method to keep the surface clean is an engineering decision based on the many tradeoffs that must be made for any particular implementation. In principle, the formation of mineral deposits can be totally eliminated by having a waste stream consisting of softened water. For large volumes of water this is impractical.

Figure 2:
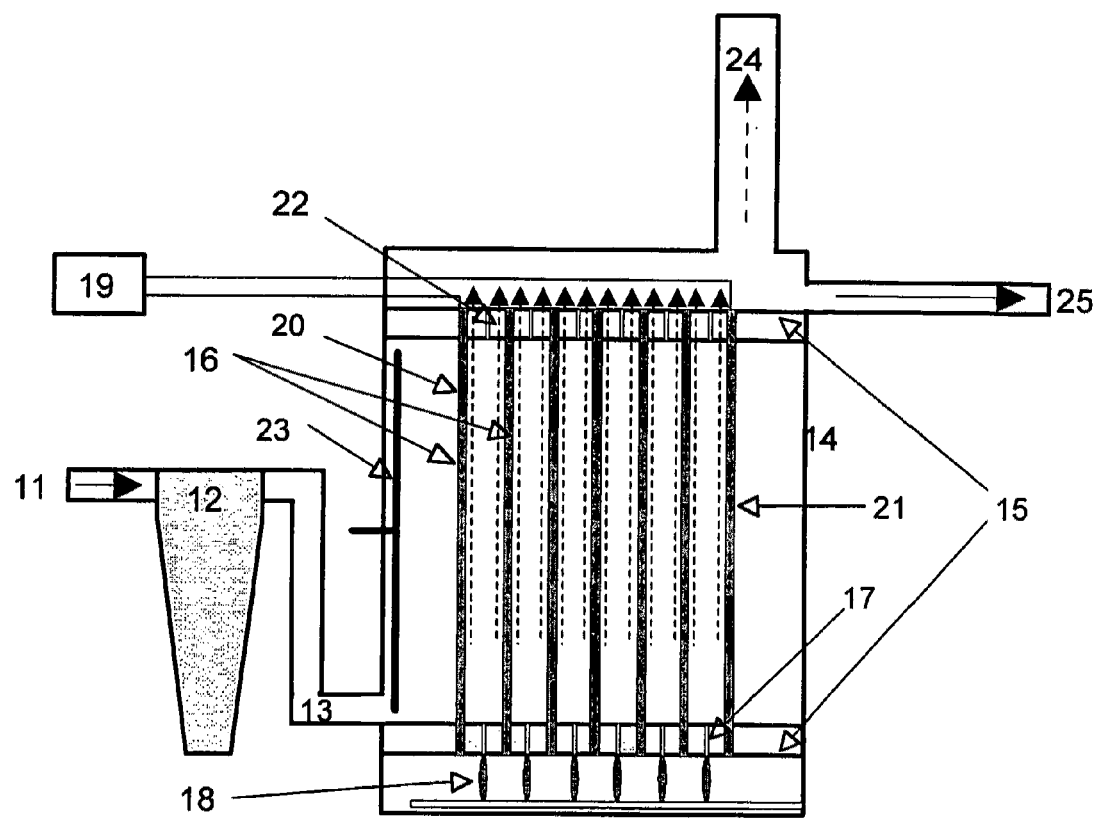
FIG. 2 is a schematic of one embodiment of the invention wherein the electrodes have a defined physical separation.
Figure 3:
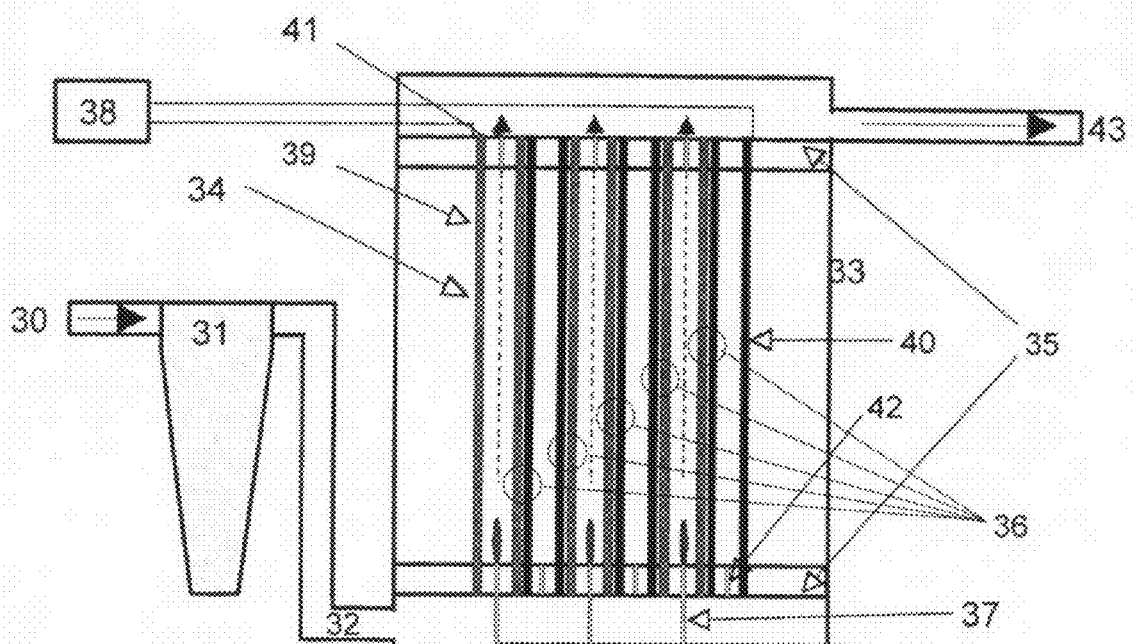
FIG. 3 is a schematic a second embodiment of the invention wherein closely spaced electrodes are mechanically separated by a thin porous membrane.

Reference is made to FIGS. 1-3. FIG. 1 is a flow diagram of the method of the invention. The cell electrodes, electrical systems, wastewater flow, and air/ammonia components found in the invention are described. The ammoniated waste water inputs at the bottom of the electrodes and exits at the top. Air containing ammonia is vented at the top of the system. FIG. 2 provides a detailed schematic view of the components and arrangement of the first embodiment. A schematic of a second embodiment using porous membranes is seen in FIG. 3.

FIG. 1 shows the block diagram of the method for ammonia removal. Wastewater 1 flows into the lower portion of the treatment tank 2. An assembly of planar electrodes 3 is suspended in the treatment tank 2. Voltage is applied to the electrode with a direct current power supply 4. Air 5 is supplied with a low pressure bubbling system 6 (e.g. venturi air injection). Ammonia gas 7 is released below the electrode assembly 3. The injected air 5 sparges the released ammonia 7 and the resulting gas mixture 8 is exhausted from the treatment tank 2. The treated wastewater 9 leaves the treatment tank 2 near the top of the tank.

Ammonia recovering 10 uses standard refrigeration techniques and recovers ammonia from the resulting gas mixture 8 for use as fertilizer. A mechanical scrubber 51 abrades the surface of one or more electrodes 3 to prevent mineral build up.

FIG. 2 shows a detailed schematic of the first embodiment. Wastewater 11 flows into a canister filter 12 (or equivalent) to ensure that the water has no significant particle content. The filtered wastewater 13 flows in the treatment unit 14. The treatment unit 14 contains an electrical series configuration of electrolysis electrodes 16. The treatment unit 14 consists of a sandwich of hollow insulating plastic plates 15 and electrolysis electrodes 16. The insulating plates can be composed of any suitable plastic such as but not limited to acrylic, polycarbonate, Teflon, or PVC. The insulating plastic plates 15 serve to precisely space the electrodes 16 and electrically isolate them. Water is fed into a series of distribution holes 17 located at the bottom of each cell (between the electrodes 16). The number, size, and length of the holes are determined by the need to minimize the leakage electrical current flowing around the plates. In the water distribution manifold sparging air 18 is injected. This sparging air 18 rises between the electrodes. A direct current power supply 19 applies voltage to the electrodes 16 at the first electrode plate 20 and the last electrode plate 21. The applied voltage per cell is the total applied voltage divided by the number of electrolysis cells 15 in the treatment unit 14. Ammonia gas 22 is formed on the electrodes 16. The sparging air 18 to the exhaust 24 carries gaseous ammonia 22 away. The resultant gas mixture flows from the treatment unit 14 where it is exhausted or potentially recovered. An ultrasonic transducer 23 applies sonic energy to the electrolysis cells 15 to prevent the build up of carbonate on the electrodes 16. The treated wastewater 25 exits the treatment unit 14.

FIG. 3 shows a close up detailed schematic of the second embodiment. The schematic for FIG. 3 is similar to that of FIG. 2 except that the space between electrodes of opposite polarity is filled with a porous membrane and the spacing is reduced. Wastewater 30 flows into a canister filter 31 (or equivalent) to ensure that the water has no significant particle content. The filtered wastewater 32 flows in the treatment unit 33. The treatment unit 33 contains an electrical series configuration of electrolysis electrodes 34 consisting of a sandwich of hollow insulating plastic positioning plates 35 and hollow porous electrolysis electrodes 34. The insulating plates can be composed of any suitable plastic such as but not limited to acrylic, polycarbonate, Teflon, or PVC. The insulating plastic plates 35 serve to precisely position the electrodes 34 together, to clamp the electrodes onto the 1-mm thick membrane 36, and electrically isolate the electrodes 34. Water is fed through holes 42 in the bottom plastic positioning plates 35 into one set of electrodes and is exhausted at the top of adjacent porous electrodes of opposite polarity. Sparging air 37 is injected into the hollow electrodes 34 as needed. A direct current power supply 38 applies voltage to the electrodes 34 at the first electrode plate 39 and the last electrode plate 40. The applied voltage per electrode pair (a cell) is the total applied voltage divided by the total number of electrolysis cells. Ammonia gas 41 is formed on the surface of the electrodes 34. Gaseous ammonia 41 migrates into the hollow electrodes and is carried away by the sparging air 37 and water. The treated wastewater 43, having passed through the electrolysis system, exits the treatment unit 33.

While the invention has been described with reference to specific embodiments, modifications and variations of the invention may be constructed without departing from the scope of the invention.

We claim:

1. A method for reducing ammonia in water, comprising: providing one or more electrochemical cells to dissociate ammonia in the water, flowing a water stream between metallic electrodes in the one or more electrochemical cells, applying a direct current voltage to the electrodes, wherein the one or more electrochemical cells cause electrolysis of the water stream and dissociate and release ammonia gas from the water, and wherein the electrodes of an electrochemical cell are porous and separated only by a porous membrane, wherein ammonium and ammonia in the water stream pass through the porous membrane, and the one or more electrochemical cells further comprise insulating spacers that hold the electrodes in position and clamp the electrodes to the porous membrane, further comprising adding sparging gas at or below one or more of the electrodes to enhance removal of the ammonia from the water.

2. The method of claim 1, wherein ammonium is directly attracted to an anode, where electrolysis of the ammonium into ammonia occurs.

3. A method for reducing ammonia in water, comprising: providing one or more electrochemical cells to dissociate ammonia in the water, flowing a water stream between metallic electrodes in the one or more electrochemical cells, applying a direct current voltage to the electrodes, wherein the one or more electrochemical cells cause electrolysis of the water stream and dissociate and release ammonia gas from the water, and wherein the electrodes of an electrochemical cell are porous and separated only by a porous membrane, wherein ammonium and ammonia in the water stream pass through the porous membrane, and the one or more electrochemical cells further comprise insulating spacers that hold the electrodes in position and clamp the electrodes to the porous membrane, further comprising recovering the ammonia removed from the water using refrigeration for use as fertilizer, wherein no waste products result from ammonia reduction.

4. The method of claim 3, further comprising reversing the polarity of the electrodes on a regular basis to remove any built up mineral deposits.

5. The method of claim 3, further comprising applying ultrasonic acoustic energy to the electrodes to prevent the build up of mineral deposits on the electrodes.

6. The method of claim 3, further comprising abrading the surface of one or more of the electrodes with a mechanical scrubber to prevent mineral build up.

7. The method of claim 3, further comprising feeding water into a series of distribution holes located at the bottom of each electrochemical cell.

8. The method of claim 3, further comprising filtering the water stream that flows between metallic electrodes.

9. The method of claim 8, further comprising filtering the water stream with a canister filter before flowing the water stream between the electrodes, and removing particle content from the water stream.

10. The method of claim 1, further comprising feeding water into a series of distribution holes located at the bottom of each electrochemical cell.

11. The method of claim 1, further comprising reversing the polarity of the electrodes on a regular basis to remove any built up mineral deposits.

12. The method of claim 1, further comprising applying ultrasonic acoustic energy to the electrodes to prevent the build up of mineral deposits on the electrodes.

13. The method of claim 1, further comprising abrading the surface of one or more of the electrodes with a mechanical scrubber to prevent mineral build up.

14. The method of claim 1, further comprising feeding water into a series of distribution holes located at the bottom of each electrochemical cell.

15. The method of claim 1, further comprising filtering the water stream that flows between metallic electrodes.

16. The method of claim 1, further comprising filtering the water stream with a canister filter before flowing the water stream between the electrodes, and removing particle content from the water stream.

* * * * *